(12) United States Patent
Sharma (10) Patent No.: US 9,811,757 B2
(45) Date of Patent: Nov. 7, 2017

(54) HISTOGRAM METHODS AND SYSTEMS FOR OBJECT RECOGNITION

(71) Applicant: Digimarc Corporation, Beaverton, OR (US)

(72) Inventor: Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 132 days.

(21) Appl. No.: 15/224,975

(22) Filed: Aug. 1, 2016

(65) Prior Publication Data

US 2017/0032213 A1 Feb. 2, 2017

Related U.S. Application Data

(63) Continuation of application No. 14/853,408, filed on Sep. 14, 2015, now Pat. No. 9,405,991, which is a (Continued)

(51) Int. Cl.
*G06K 9/00* (2006.01)
*G06K 9/46* (2006.01)
(Continued)

(52) U.S. Cl.
CPC ............ *G06K 9/4642* (2013.01); *G06K 9/38* (2013.01); *G06K 9/4652* (2013.01); *G06K 9/6212* (2013.01)

(58) Field of Classification Search
CPC ............ G06K 9/00127; G06K 9/0014; G06K 9/00147; G06K 9/00221; G06K 9/00771; G06K 9/38; G06K 9/4642; G06K 9/4647; G06K 9/4652; G06K 9/6201; G06K 9/621; G06K 9/6212; G06K 9/6226; G06K 9/6269; G06K 2017/0077; G06T 5/40; G06T 7/0081; G06T 7/0083; G06T 7/0085;
(Continued)

(56) References Cited

U.S. PATENT DOCUMENTS 4,185,270 A 1/1980 Fischer, II et al.
5,546,475 A 8/1996 Bolle et al.
(Continued)

FOREIGN PATENT DOCUMENTS

WO WO2005071612 8/2005
WO WO2010135455 11/2010

OTHER PUBLICATIONS

Chevallet et al, SnapToTell—A Singapore Image Test Bed for Ubiquitous Information Access from Camera, Lecture Notes in Computer Science, vol. 3408, pp. 530-532, 2005.
(Continued)

*Primary Examiner* — Jose Couso
(74) *Attorney, Agent, or Firm* — Digimarc Corporation (57) ABSTRACT

A multidimensional histogram is used to characterize an image (or object), and is used to identify candidate matches with one or more reference images (or objects). An exemplary implementation employs hue information for two of the dimensions, and a second derivative function based on luminance for a third dimension. The simplicity and speed of the detailed arrangements make them well suited for use with cell phones and other mobile devices, which can use the technology for image/object recognition, e.g., in visual search applications.

20 Claims, 6 Drawing Sheets

Related U.S. Application Data continuation of application No. 14/321,415, filed on Jul. 1, 2014, now Pat. No. 9,135,520, which is a continuation of application No. 13/213,963, filed on Aug. 19, 2011, now Pat. No. 8,767,084, which is a continuation of application No. 12/468,402, filed on May 19, 2009, now Pat. No. 8,004,576.

(51) Int. Cl.
 *G06K 9/38* (2006.01)
 *G06K 9/62* (2006.01)

(58) Field of Classification Search
 CPC ........... G06T 7/408; G06T 2207/10016; G06T 2207/10024; G06F 17/30256; H04N 1/4074; H04N 9/735
 See application file for complete search history.

(56) References Cited

U.S. PATENT DOCUMENTS

| | | | |
|---|---|---|---|
| 5,821,945 A | 10/1998 | Yeo et al. | |
| 5,933,524 A | 8/1999 | Schuster et al. | |
| 6,181,817 B1 | 1/2001 | Zabih | |
| 6,477,272 B1 | 11/2002 | Krumm et al. | |
| 6,584,223 B1 | 6/2003 | Shiiyama | |
| 6,584,465 B1 | 6/2003 | Zhu et al. | |
| 6,738,631 B1 | 5/2004 | Adler et al. | |
| 6,757,428 B1 | 6/2004 | Lin et al. | |
| 6,788,818 B1 | 9/2004 | Krumm et al. | |
| 6,807,298 B1 | 10/2004 | Park et al. | |
| 6,901,163 B1 | 5/2005 | Pearce et al. | |
| 6,952,496 B2 | 10/2005 | Krumm | |
| 7,046,842 B2 * | 5/2006 | Lin .................... | G06K 9/3241 382/165 |
| 7,181,064 B1 | 2/2007 | Stevens et al. | |
| 7,519,200 B2 | 4/2009 | Gokturk et al. | |
| 7,657,100 B2 | 2/2010 | Gokturk et al. | |
| 7,715,623 B2 | 5/2010 | Ling et al. | |
| 7,792,887 B1 | 9/2010 | Amirghodsi | |
| 8,004,576 B2 | 8/2011 | Sharma | |
| 8,767,084 B2 | 7/2014 | Sharma | |
| 9,135,520 B2 | 9/2015 | Sharma | |
| 9,405,991 B2 | 8/2016 | Sharma | |
| 2001/0048765 A1 | 12/2001 | Yi et al. | |
| 2002/0057343 A1 | 5/2002 | Ronk et al. | |
| 2002/0072982 A1 | 6/2002 | Barton | |
| 2002/0078043 A1 | 6/2002 | Pass et al. | |
| 2002/0081026 A1 | 6/2002 | Izume et al. | |
| 2002/0136448 A1 | 9/2002 | Bortolussi et al. | |
| 2003/0044061 A1 | 3/2003 | Prempraneerach et al. | |
| 2003/0074368 A1 | 4/2003 | Schuetze et al. | |
| 2003/0128874 A1 | 7/2003 | Fan | |
| 2003/0215134 A1 | 11/2003 | Krumm | |
| 2004/0037460 A1 | 2/2004 | Luo et al. | |
| 2004/0170318 A1 | 9/2004 | Crandall et al. | |
| 2004/0189873 A1 | 9/2004 | Konig et al. | |
| 2004/0228526 A9 | 11/2004 | Lin et al. | |
| 2005/0025357 A1 | 2/2005 | Landwehr et al. | |
| 2005/0141002 A1 | 6/2005 | Takano et al. | |
| 2005/0226496 A1 | 10/2005 | Finlayson | |
| 2006/0098897 A1 | 5/2006 | Dewaele | |
| 2006/0147186 A1 | 7/2006 | Kasutani et al. | |
| 2006/0233440 A1 | 10/2006 | Lee et al. | |
| 2006/0251292 A1 | 11/2006 | Gokturk et al. | |
| 2007/0047809 A1 * | 3/2007 | Sasaki ................ | G06K 9/00791 382/170 |
| 2007/0073749 A1 | 3/2007 | Fan | |
| 2008/0005091 A1 | 1/2008 | Lawler et al. | |
| 2008/0044061 A1 | 2/2008 | Hongo | |
| 2008/0059899 A1 | 3/2008 | Gemmell et al. | |
| 2008/0082426 A1 | 4/2008 | Gokturk et al. | |
| 2009/0180697 A1 | 7/2009 | Erol et al. | |
| 2009/0244291 A1 | 10/2009 | Saptharishi et al. | |
| 2010/0046842 A1 | 2/2010 | Conwell | |
| 2010/0142805 A1 | 6/2010 | Maxwell et al. | |
| 2010/0142825 A1 | 6/2010 | Maxwell et al. | |
| 2011/0103700 A1 | 5/2011 | Haseyama | |
| 2013/0085893 A1 * | 4/2013 | Bhardwaj .......... | G06Q 30/0643 705/26.62 |

OTHER PUBLICATIONS

Geusebroek, Compact Object Descriptors from Local Colour Invariant Histograms, British Machine Vision Conf., vol. 3, pp. 1029-1028, 2006.

Manjunath et al, Color and Texture Descriptors, IEEE Trans on Circuits and Sys for Video Technology, vol. 11, No. 6, pp. 703-715, Jun. 2001.

Neira, Computer Vision: Introduction, online paper, Feb. 12, 2008 (from PCT International Search Report in PCT/US10/35449).

Schiele, et al, Recognition without Correspondence using Multidimensional Receptive Field Histograms, IJ Computer Vision, Vo. 36, No. 1, 2000, pp. 31-52.

Seong-O Shim, Edge Color Histogram for Image Retrieval, IC on Image Processing, vol. 3, pp. 957-960, 2002.

Swain et al, Color Indexing, International Journal of Computer Vision, 7:1, 1991, pp. 11-32.

Zin et al, A Method Using Morphology and Histogram for Object-Based Retrieval in Image and Video databases, IJCSNS, vol. 7, No. 9, 2007, pp. 123-129.

International Search Report, Jul. 29, 2010, in PCT/US10/35449.

English translation of Office action dated Feb. 16, 2013 from the Patent Office of the People's Republic of China in application 201080031946.4, which corresponds to PCT published application WO2010135455.

* cited by examiner

ORIGINAL IMAGE

| R | R | R | R | R |
|---|---|---|---|---|
| R | R | R | R | R |
| R | R | R | R | R |
| R | R | R | R | R |
| R | R | R | R | R |
| R | R | R | R | R |

ZOOM OUT, ADD BACKGROUND →

TEST IMAGE

| O | O | O | O | O | O |
|---|---|---|---|---|---|
| O | O | R | R | R | O |
| O | O | R | R | R | O |
| O | O | R | R | R | O |
| O | O | O | O | O | O |
| O | R | O | O | O | O |

↙ CONSIDER ONLY BINS THAT ARE OCCUPIED IN ORIGINAL IMAGE

| R | R | R |
|---|---|---|
| R | R | R |
| R | R | R |

← DISREGARD NON-CONTIGUOUS OUTLIERS

| R | R | R |
|---|---|---|
| R | R | R |
| R | R | R |

| Test Image | | Reference Image | | |
|---|---|---|---|---|
| | | | | |
| Rotate 10 degrees | Intersection | 99.55 | 45.87 | 50.48 |
| | Match | 100 | 66.67 | 51.52 |
| Rotate 35 degrees | Intersection | 99.29 | 45.93 | 50.48 |
| | Match | 100 | 66.67 | 51.52 |
| Crop 30% | Intersection | 78.77 | 43.14 | 57.45 |
| | Match | 100 | 70.97 | 54.83 |
| Enlarge 150%; crop | Intersection | 87.43 | 48.08 | 51.59 |
| | Match | 94.12 | 70.59 | 52.94 |
| Reduce 70% & background | Intersection | 56.60 | 43.72 | 39.64 |
| | Match | 87.10 | 74.19 | 51.61 |
| Perspective | Intersection | 89.46 | 45.78 | 55.09 |
| | Match | 100 | 66.67 | 51.52 |

HISTOGRAM METHODS AND SYSTEMS FOR OBJECT RECOGNITION

CROSS-REFERENCE TO RELATED APPLICATIONS

This application is a continuation of application Ser. No. 14/853,408, filed Sep. 14, 2015 (now U.S. Pat. No. 9,405,991), which is a continuation of application Ser. No. 14/321,415, filed Jul. 1, 2014, (now U.S. Pat. No. 9,135,520), which is a continuation of application Ser. No. 13/213,963, filed Aug. 19, 2011 (now U.S. Pat. No. 8,767,084), which is a continuation of application Ser. No. 12/468,402, filed May 19, 2009 (now U.S. Pat. No. 8,004,576).

TECHNICAL FIELD

The present technology relates to image and video processing, and more particularly relates to representing imagery by simple features—such as color histograms.

BACKGROUND AND SUMMARY

The present technology builds on, and extends, technology disclosed in other patent applications by the present assignee. The reader is thus directed to the following applications that serve to detail arrangements in which applicants intend the present technology to be applied, and that technically supplement the present disclosure:

application Ser. No. 61/110,490, filed Oct. 31, 2008;
application Ser. No. 12/271,692, filed Nov. 14, 2008 (now U.S. Pat. No. 8,520,979);
application Ser. No. 12/271,772, filed Nov. 14, 2008 (published as US20100119208);
application Ser. No. 61/150,235, filed Feb. 5, 2009;
application Ser. No. 61/157,153, filed Mar. 3, 2009;
application Ser. No. 61/167,828, filed Apr. 8, 2009;
application Ser. No. 61/169,266, filed Apr. 14, 2009; and
application Ser. No. 61/176,739, filed May 8, 2009.

The disclosures of these documents are incorporated herein by reference.

In one aspect, this specification concerns techniques for recognizing an image (or a video) as one of many stored in a database. The techniques can also be used for recognizing objects in images.

A basic concept behind many of these techniques is representing an image (or object) in terms of simple features that are either invariant to geometric transformations, change of view, noise, occlusions, background, luminance and lighting changes, or that vary slowly with these effects. One such representation is the 3D Color Histogram (c.f., Swain and Ballard, "Color Indexing," International Journal of Computer Vision, 7(1):11-32, 1991).

Color histograms can be computed relatively quickly and have been widely used for recognition and indexing tasks. However, traditional color histograms suffer from a variety of shortcomings, such as sensitivity to brightness, contrast and luminance changes, and change in illumination.

Aspects of the present technology concern extension of color histogram concepts to create simple representations that are less sensitive to such effects. In addition, simple matching techniques are disclosed, based on histogram parameters and set theory, to provide better robustness under geometric transformations. Also detailed are techniques using histogram representations for quick database search and reduction of search space.

The detailed technology is well suited for operation on mobile devices or embedded systems, mainly due to their simplicity and speed.

The foregoing will be more readily apparent from the following detailed description, which proceeds by reference to the accompanying drawings.

3D COLOR HISTOGRAMS

Swain and Ballard (supra) introduced the use of color histograms for representing color objects for the task of recognition. They showed that color histograms provide stable representations in the presence of occlusion and changes in view, and that they can differentiate among large numbers of objects. They introduced a measure called histogram intersection for comparing test and reference histograms for matching.

Figure 1A:
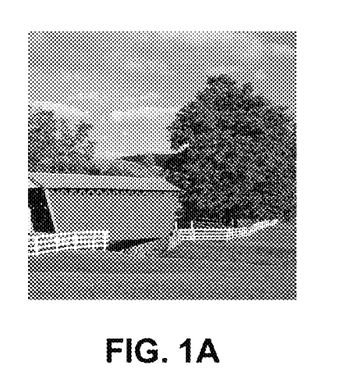
FIG. 1A shows a first reference image.
Figure 1B:
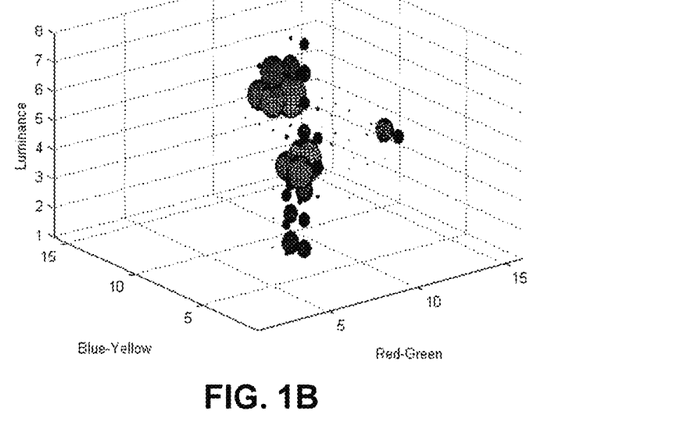
FIG. 1B shows a 3D histogram for the FIG. 1A image, with 8 bins for luminance and 16 bins each for the Red-Green and Blue-Yellow opponent color directions (i.e., 2048 data elements). Spheres indicate the counts of non-zero histogram bins. The sizes of the spheres indicate the number of pixels in each bin.

A color histogram counts the number of times a given color occurs in an image. Colors can be specified in a discrete color space representation such as RGB, HSV or a combination of luminance and opponent colors. FIGS. 1A and 1B show an image and its 3D color histogram with the color axes represented by Luminance (L), Red-Green (RG) and Blue-Yellow (BY). Luminance is quantified into 8 bins, with the other color axes being quantized into 16 bins each (i.e., 2048 data elements across the 3D histogram). The L, R–G, and B–Y color values are obtained from the RGB values as:

$L = 0.333*(R+G+B)$ $RG = 0.5*(R-G)$ $BY = 0.5*B - 0.25*(R+G)$

Figure 2A:
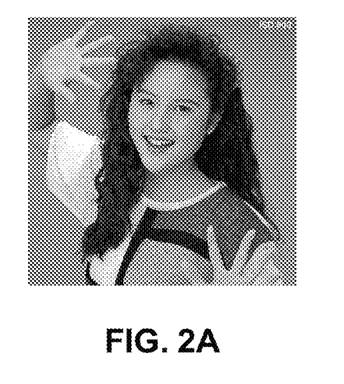
FIGS. 2A and 2B are similar to FIGS. 1A and 1B, but show a second reference image.
Figure 2B:
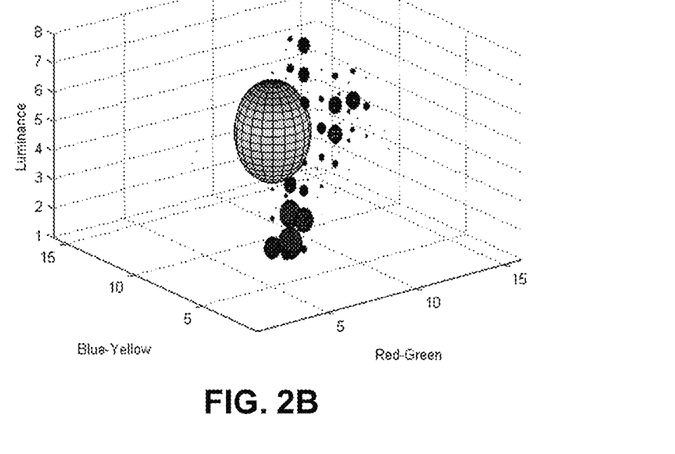

FIGS. 2A and 2B show another image and its corresponding color histogram. Comparison of the histograms in FIG. 1 and FIG. 2 indicates that the histograms characterize the distinguishing color features for each image.

Object Recognition, Similarity and Matching Using Histograms

The 3D histogram (or color histogram) measures the amount or proportion of each type of color component in the image. This provides a characterization of the image in terms of its colors. For example consider a 3D histogram comprising the Red, Green and Blue components as the 3 histogram axes. Then a simple image of a red flower against a green background will have dominant color components along the red and green axes. Assume that 25 percent of the pixels are red and that the remaining pixels are green. Then all images whose histograms have just red and green components can be considered "similar" to the flower image. Images whose histograms have just red and green, and in roughly the same proportion (1:3) as the flower image, can be considered as further matched to the flower image. Images of the flower against the green background taken through slightly different poses can also be recognized.

Histogram Intersection

Histogram intersection provides a measure of similarity between two histograms. The histogram intersection measure for histograms containing N bins is given by the sum of the counts common to both histograms. Swain and Ballard defined histogram intersection as $$h(t, r) = \sum_{i=1}^{N} \min(t_i, r_i)$$

where h(t,r) is the histogram intersection between the test image t and the reference image r. Basically, the histogram intersection metric gives the count of the number of pixels that are common to the test and reference histograms. A high value for h(t,r) indicates that the test histogram matches the reference histogram.

Swain and Ballard also defined a normalized histogram intersection measure as $$H(t, r) = \sum_{i=1}^{N} \min(t_i, r_i) / \sum_{i=1}^{N} r_i$$

Normalized histogram intersection H(t,r) is 1.0 if the test image is identical to the reference image. For dissimilar images, the normalized histogram intersection value is closer to zero.

Histogram intersection can be interpreted as the intersection between two sets—one set representing the histogram of the test image and the other set representing the histogram of the reference image.

Extending the Basic Histogram Approach

Color histograms are invariant to translation and rotation about an axis perpendicular to the image. (The colors and their proportions do not change as the image is displaced side to side, or rotated.) Color histograms also tend to vary only slowly with occlusion and background confusion.

In contrast, color histograms tend to be sensitive to luminance modifications and lighting (illumination) changes. Approaches based on remedial modifications to Swain and Ballard's original techniques have been proposed. One such approach employs multidimensional receptive field histograms, where objects are represented by joint statistics of local neighborhood operators such as Gabor filters (see, e.g., Schiele, et al, "Recognition Without Correspondence Using Multidimensional Receptive Field Histograms," International Journal of Computer Vision, 36(1), pp. 31-52, 2000). However, these approaches are either computationally intensive or require use of hardware accelerators.

This specification next details a variety of new approaches that extend the histogram concept, yet involve simple computations, and can be used under a broader range of lighting and luminance changes—as well as geometric transformations.

Standardized Histograms

The normalized histogram intersection discussed above is sensitive to simultaneous change in scale and resolution (i.e., increase or decrease in size) of the test image or object. For example, consider a reference image of size 1000×1000 pixels, and a test image that is scaled by a factor of 10 in each direction, yielding a size of 100×100 pixels. The normalized histogram intersection H between these two images will be low.

In accordance with one aspect of the present technology, in order to account for a change of size, the histograms are standardized before computing the intersection. One approach to standardization is to normalize the total histogram count to unity (or some constant such as 100 to denote percentages).

Each bin $C_i$ of the standardized histogram is calculated from the corresponding bin $c_i$ of the regular histogram as $$C_i = \left( c_i / \sum_{i=1}^{N} c_i \right) \times 100$$

where N is the total number of bins in the histogram. The histograms shown in FIGS. 1 and 2 are standardized histograms.

Histogram intersection calculated on standardized histograms is invariant to simultaneous scale and resolution change (i.e. a change in size). In the example above, the histogram intersection calculated using the standardized histograms will still be 100.

Reducing Sensitivity to Lighting and Luminance Changes

The histograms and histogram intersections discussed above are sensitive to luminance changes. Luminance changes can be introduced by change in brightness/contrast in the case of digital images, and by a change in illumination in the case of physical objects.

In accordance with another aspect of the present technology, one approach to handling changes in luminance is to coarsely quantize the luminance axis of the 3D histogram. For example, the number of luminance bins in FIG. 1 can be reduced to 4 instead of 8. Coarsely quantizing luminance has the advantage that small variations in luminance do not cause the histogram bin counts to change radically.

Another approach to reducing sensitivity to lighting and luminance changes is to compute the second derivative of the luminance plane, and to use this—instead of luminance—as the third dimension (in addition to the two opponent color directions).

The second derivative can be computed, or approximated, in a number of ways. A few include using the Laplacian of Gaussian operator, a Difference of Gaussians (DoG) formulation, a Laplacian operator, etc (each termed a "second derivative function" herein). In the results reported below a DoG operation is used.

The second derivative function, itself, is somewhat sensitive to luminance change—such as a change in dynamic range for the luminance plane. In accordance with another aspect of the present technology, sensitivity to such change is further reduced by considering only the polarity (sign) of the second derivative. Further, second derivatives of relatively small magnitude can be considered as noise and treated separately from the positive and negative derivatives.

Small magnitudes can be identified by comparison with a threshold, where the threshold itself is adjusted in accordance with the dynamic range of the luminance plane. This operation creates three quantized levels from the second derivative of the luminance plane—the first level corresponding to the negative second derivatives exceeding the threshold, the second level corresponding to the second derivatives whose magnitudes (absolute value) are less than or equal to the threshold, and the third level corresponding to the positive second derivatives higher than the threshold.

Figure 3:
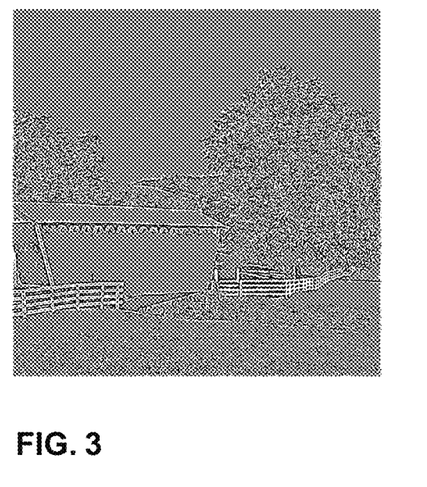
FIG. 3 shows a second derivative of the luminance of FIG. 1A, after thresholding into three levels.

An example is shown in FIG. 3. These three quantized levels can be used to represent bins of the modified "luminance" axis.

It will be recognized that the particular example given (i.e., in which the second derivative of the luminance is used as the third histogram dimension) is one of a class of representations that characterize the image/object in terms of the colors present at edge boundaries. The artisan will understand that a variety of other functions, operators and transforms can be used to similar effect.

The arrangements just-discussed introduce some notion of object shape into the histogram. Yet the stability and invariance/robustness properties provided by the histogram approach are maintained. Consequently, recognition relies on edge information in addition to color. (A classic shortcoming of traditional histogram approaches is that they may not be able to distinguish between a red-and-white checkered cup and a red-and-white checkered saucer—their color compositions may be identical. The arrangement just-described, in contrast, can readily so-distinguish due to incorporation of edge-related information.)

Shim and Choi proposed a color histogram with directional edge information ("Edge Color Histogram for Image Retrieval," International Conference on Image Processing, pp. 957-960, Vol. 3, June 2002). However, the present approach does not depend on directional edge information. Directional edge information changes with geometric manipulation, such as rotation. The present arrangement does not suffer that failing. (Also, Shim computed three color histograms, whereas the just-detailed arrangement computes just one 3D histogram.)

Schiele (cited earlier) and Geusebroek et al ("Compact Object Descriptors from Local Colour Invariant Histograms," British Machine Vision Conference, volume 3, pages 1029-1038, 2006) employed derivatives for histogram representation. However, the representation detailed above is simpler, involves fewer computations, and therefore is more tractable for implementation on cell phones and other handheld devices.

An alternative to using three quantized levels based on the second derivative of luminance, is to use two: positive values above a certain threshold and negative values below the negative value of the same threshold (or another threshold). Effectively, this discards the flatter regions of the image from the histogram calculation and emphasizes only the edge regions. Use of this bipolar second derivative information along one axis, and the opponent colors along the other two axes, also reduces the number of computations for histogram comparisons. (A drawback of this bipolar approach, however, is that it can be more sensitive to cropping and occlusions, since flat parts of the image become disregarded and edge information predominates. In many applications, this is not critical.)

In other implementations, the bipolar approach can be combined with the tri-level approach earlier detailed (e.g., with different portions of an image).

Non-Uniform Quantization

For non-saturated colors, most of the information contained in the opponent color axes has low dynamic range. For example, consider the Red-Green axis. If the Red and Green values are between 0 and 255, the RG values lie between −127.5 and +127.5. For non-saturated regions, most of the values will be around 0. This causes reduced discrimination for non-saturated images. In accordance with another aspect of the present technology, non-uniform quantization of the color axes is used to overcome this reduced discrimination. For example, the RG axis can be divided into bins such that the values around zero are finely quantized whereas the values at the extremities are coarsely quantized. This has been shown to this increase robustness (e.g., number of correct matches).

Figure 4A:
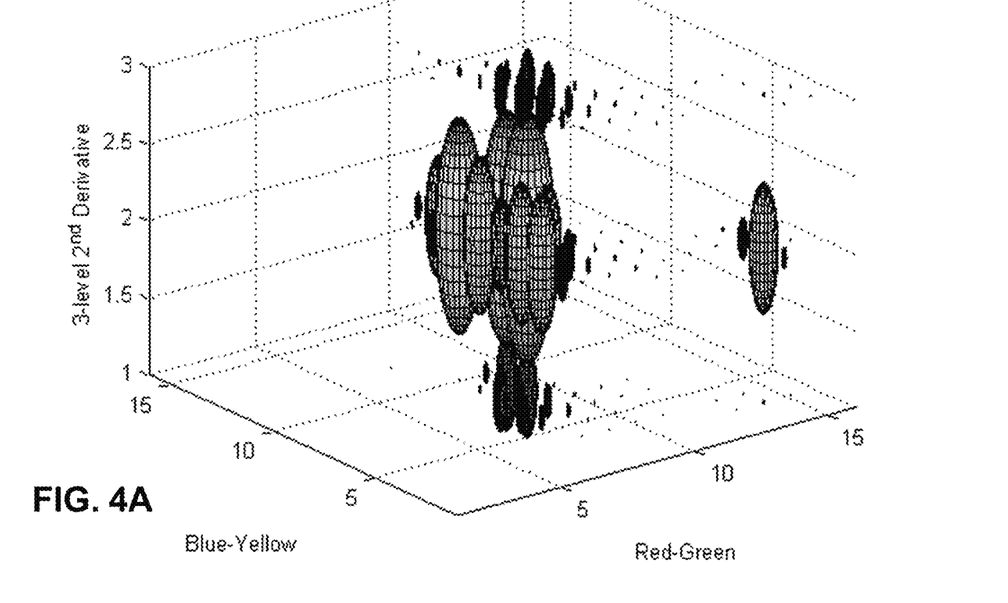
FIGS. 4A and 4B are similar to FIGS. 1B and 2B, but with a second derivative-like function for the luminance axis—quantized into just three levels, and with non-uniform quantization of the component color axes.
Figure 4B:
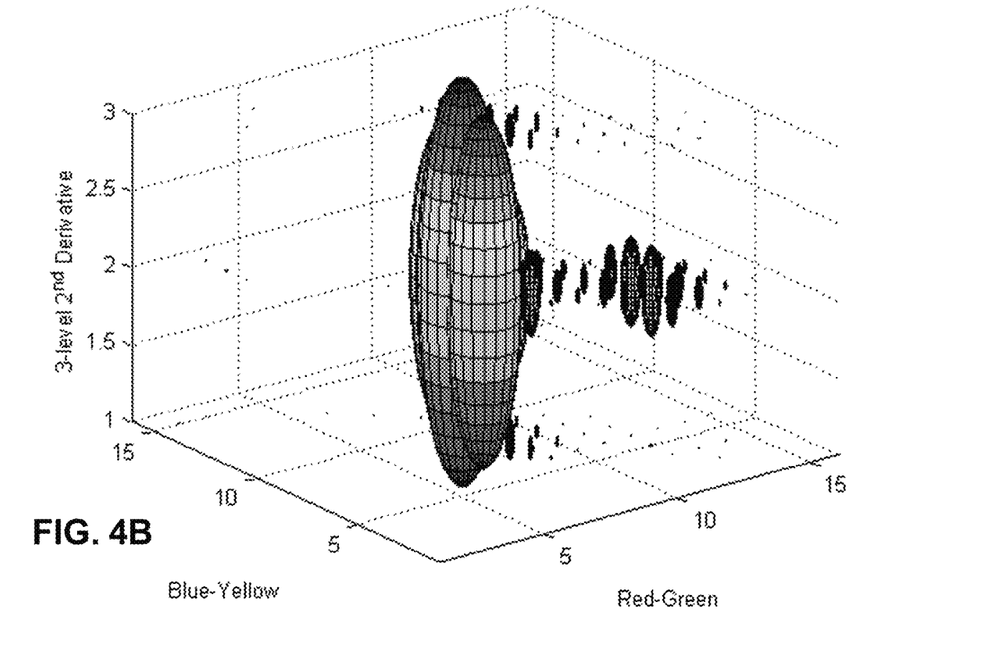

FIG. 4A shows such a 3D histogram for the image of FIG. 1A, in which the Z-axis is a tri-level Difference of Gaussians of the luminance component, as previously described, and with non-uniform quantization of color components along the X and Y axes. FIG. 4B is similar, but corresponds to the image of FIG. 2A.

Color Constancy Under Illumination Changes

Figure 5A:
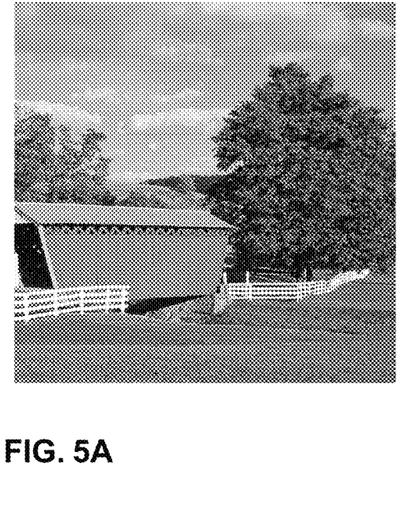
FIGS. 5A and 5B are the reference image of FIG. 1A, showing how change in illumination can cause a change in color.
Figure 5B:
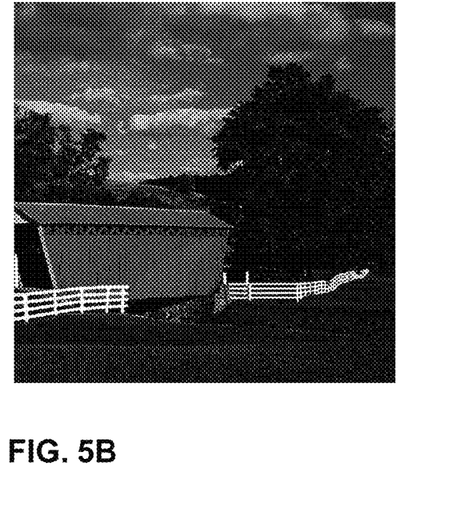

Change in illumination can cause a change in color. A simulation of the effect of illumination change on colors is shown in FIGS. 5A and 5B, with the original image on the left and the changed one on the right. The human visual system is good at compensating for illumination change such that the perceived colors appear the same. Digital systems, however, are not as forgiving.

In accordance with a further aspect of the present technology, sensitivity to illumination is decreased by working with color components that are less sensitive to luminance change. For example, the hue of a color is likely to remain unchanged under a change in illumination, e.g., an increase or decrease in incident light. (Hue is invariant to additive and multiplicative changes applied to the R, G, B color channels.) Using hue as one or two of the dimensions of a histogram, and using the bipolar or tri-level second derivative of luminance as another, can provide robustness under changing illumination.

In accordance with another aspect of the present technology, stability under illumination change is increased by normalizing opponent color directions by a difference between the maximum and minimum at each pixel. Let:

$$\text{Max Val} = \text{Max}(R,G,B) \text{ (at each pixel)}$$

$$\text{Min Val} = \text{Min}(R,G,B) \text{ (at each pixel)}$$

$$RG' = (R-G)/(\text{Max Val} - \text{Min Val})$$

$$BY' = (B - 0.5*(R+G))/(\text{Max Val} - \text{Min Val})$$

This is akin to the computation of hue (c.f., Manjunath, et al, "Color and Texture Descriptors, IEEE Trans. on Circuits and Systems for Video Technology, Vol. 11, No. 6, pp. 703-715, June 2001). The normalization by (Max Val−Min Val) makes the color components invariant to additive and multiplicative changes to the color channels.

The histogram intersection between the two images in FIG. 5 without such normalization is 37.83; with it, the histogram intersection increases to 81.10.

Yet another approach for achieving color invariance under illumination change is to use a measure of color contrast instead of color directly. Still another alternative is to use transitions (spatial derivatives) in the color planes (c.f., Geusebroek, cited above). A simple method of obtaining the transitions is to use the second derivative on the luminance plane as described above.

Histogram Metrics and Features

In addition to the histogram intersection metric described earlier, there are other metrics and features that can be useful in comparing histograms for matching objects or images. Some of these metrics are:
1) Number of occupied (i.e., nonzero) bins of Test and Reference <Nt and Nr>
2) Number of bins common to both histograms (bin intersection) <Ni>
3) Number of bins combined of both histograms (bin union) <Nu>
4) Number of pixels common to both histograms (histogram intersection) <H(t, r)>
5) Percentage of occupied bins of test histogram that are occupied in the reference histogram (bin similarity and subset)
6) Ratio of histogram intersection to number of occupied bins of test histogram
7) Nonzero bins of test <Bt>
8) Nonzero bins of reference <Br>
9) Nonzero bins of test image that are a subset of nonzero bins of reference image <Btr>
10) Number of nonzero bins of test image that are a subset of nonzero bins of reference image <Ntr>
11) Nonzero bins of reference image that are a subset of nonzero bins of test image <Brt>
12) Number of nonzero bins of reference image that are a subset of nonzero bins of test image <Nrt>

These metrics can be combined (e.g., by taking ratio, difference, product, sum, etc.) to yield other metrics.

Throughout the arrangements detailed in this specification, bins which have insignificant contributions (say bin counts less than 1%, 0.3%, 0.1%, 0.03%, etc) may be treated as being unoccupied (i.e., having zero bin counts) in order to increase robustness.

Set Operations on Histograms

As described before, histogram intersection is a set operation for comparing two histograms. Histogram intersection operates on contents of the histogram bins. In accordance with another aspect of the present technology, intersection can also be calculated on the set of non-zero bins in each histogram. Other set operations, such as subsets, difference sets, etc, have also been found to be useful in comparing histograms for object and image matching. This is described further below.

One example of using set operations on the histograms is to filter out background content. When comparing a test image and a reference image, colors pertaining to the background content can be assumed to be absent in the reference image. By considering only those non-zero bins of the reference image which are a subset of the nonzero bins of the test image, the background can be filtered out. (See, also, the discussion of FIG. 6, below.)

Another example is the case of two images which are dissimilar. In this case, the intersection set of the nonzero bins of these images is small, and the difference set is large in comparison.

Multi-Dimensional Histograms

The luminance and opponent color direction arrangement described above is just one example of a representation that can be used to create multi-dimensional histograms. Other color spaces such as YUV, YCbCr, HSV, HSL, Lab, etc., can also be used. In addition, a histogram can comprise more than two dimensions by including features such as edges or other spatial statistics along additional dimensions (c.f., Schiele, cited above). (In some embodiments, one or two dimensions can also be used.)

Recognition Under Geometric Transformations

The following sections describe how multidimensional histogram-based characterization of images and objects can be used for recognition and matching under different types of geometric transformations.

Translation

Translation (without cropping) does not have any effect on the illustrative 3D histogram—it is invariant to translation. The standardized histogram intersection measure by itself is appropriate for matching a translated image to the original.

A test for translation would be to check whether the histogram intersection is higher than a matching threshold Tm (say 75% for standardized histogram intersection, normalized to a maximum value of 100%).

Cropping

When an image is subjected to cropping, the cropped image retains part of the characteristics of the original image. A large number (often a majority) of the nonzero bins of the cropped image should then be a subset of the nonzero bins of the original image. A check for cropping would be to test whether $Ntr > Tc \times Nt$, where Tc is a cropping threshold that specifies the amount of cropping that can be tolerated.

The values of the bins of the cropped image may have an arbitrary relationship with the corresponding bins of the original image. However, an additional check based on histogram intersection can also be put into place by checking whether the standardized histogram intersection exceeds a set threshold.

Rotation

The illustrative 3D histogram is unaffected by rotation when there is no cropping involved. The histogram intersection measure is appropriate for such cases. Note that background confusion (i.e., background content that is not present in the reference image) will adversely affect the histogram intersection under rotation if the background shares characteristics that are similar to the reference or test images. Background effects can be overcome by considering only those bins of the reference that are present in the test image (see, e.g., the discussion of zooming out, below).

Scale Change

In the case of scale change, the image is either enlarged or reduced in size compared to the original image. Three different cases are detailed below: one in which both the scale and resolution change (i.e., the size of the image—in pixels—changes as the image is scaled); another in which the size of the resulting image—in pixels—remains the same while the image content (or object within the image) is scaled up (i.e., zooming in and cropping); and another in which the size of the resulting image—in pixels—remains the same while the image content is scaled down (i.e., zooming out and adding new background).

Scale And Resolution Change

Image Size Changes

Scale change that causes the image size to change will cause the number of pixels in the image histogram to be mismatched with the number of pixels in the reference histogram. This can be compensated for by standardizing both histograms as described earlier. For example, the histogram bins can be normalized such that the sum of the histogram bins totals 100. This standardization compensates for image size change.

Zooming in while Maintaining Image Size Constant

Enlargement and Cropping

In this case the image content is enlarged (i.e., objects in the image appear larger) while the image size is kept unchanged by cropping the image content outside of the original size. Since cropping is involved, part of the colors of the original image will be missing. However, a large number (often a majority) of the colors present in the zoomed/cropped image should also be present in the original image. A test for this case is to check whether a majority of nonzero bins of the test image are a subset of the nonzero bins in the reference image. In addition, for the subset bins, the counts of at least some of the bins should be larger than the corresponding counts for the reference image. This confirms enlargement. The scale factor (or zoom value) can be determined using regression techniques (i.e., what is the scale factor that represents the relationship between the test and reference bin counts in a least squares sense?).

Zooming Out while Maintaining Image Size Constant

Reduction & Background

In this case the size of the original image is reduced, and the original image content is surrounded by new background content.

Zooming-out may entail an operation such as averaging to yield the new (down-sampled) pixel values. This operation can introduce new colors that are not strictly found in the reference image. However, due to the quantizing of color data into a relatively small number of bins, these new intermediate colors will fall within bins that are already populated in the reference image.

If zooming-out introduces new background pixels that are dissimilar to the original image content (as will generally be the case), the new background region can be effectively filtered-out by considering only those bins of the test image that are a subset of the nonzero bins of the reference image.

For a matching reference image, a large number (often a majority) of the nonzero bins of the reference image should also be nonzero in the test image (some leeway may be allowed to account for cropping). The standardized histogram intersection can then be computed using just these bins (i.e., bins which are common to both test and reference). This intersection value can be compared to a threshold. The scale factor (or zoom value) can be determined by regression by comparing the corresponding bin values.

A further refinement is to identify and spatially segment a candidate region of pixels from a (e.g., zoomed-out) test image for further analysis. Again, this can be done by reference to bins of the test image that are a subset of the nonzero bins of the reference image.

Figure 6:
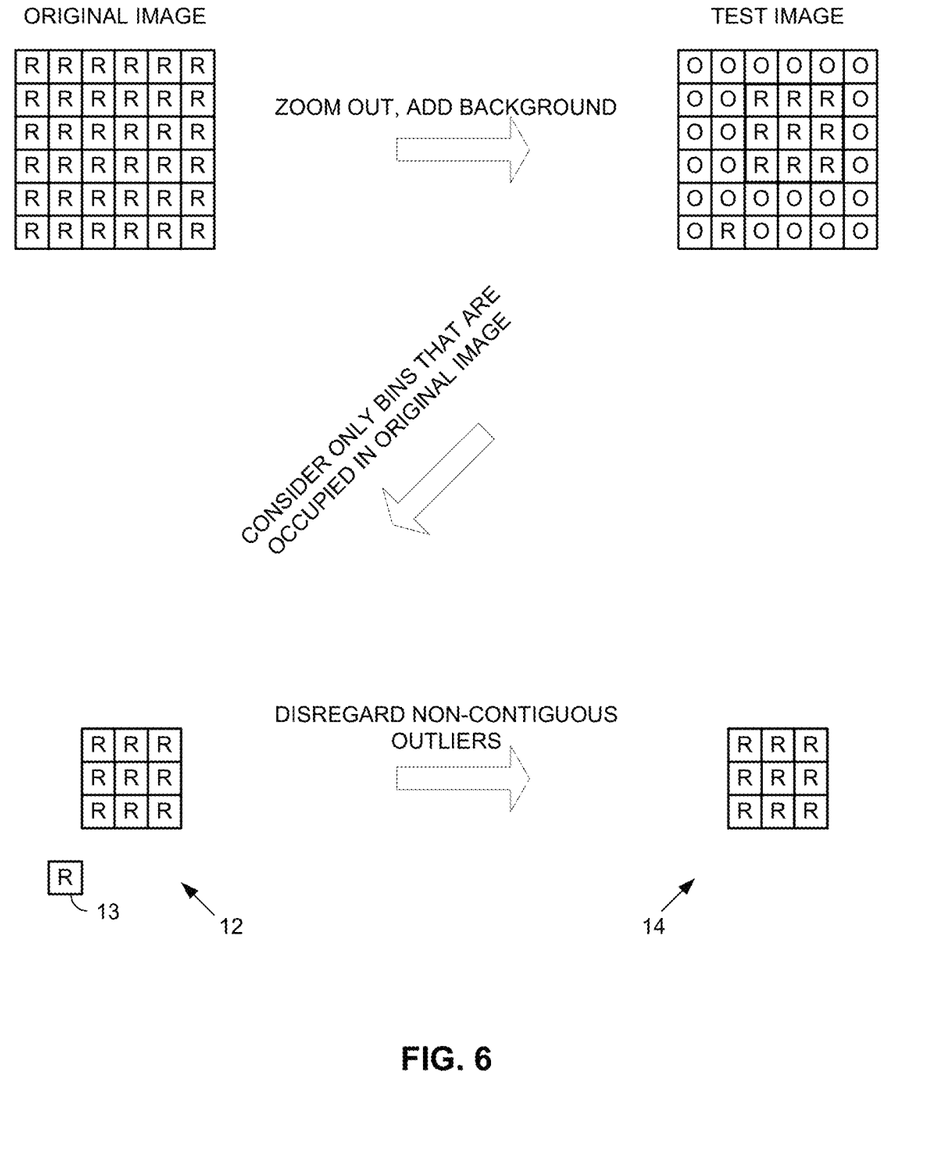
FIG. 6 is a flow diagram illustrating segmentation of a candidate portion of a zoomed-out image for histogram, or other, analysis.

Referring to FIG. 6, an original image (of all red pixels, "R") is zoomed-out, and surrounded by new background pixels (labeled "O" for "other," except for a lone red pixel R that happens to match a bin in the original image). Considering only those bins of the test image that are a subset of the non-zero bins of the reference image serves to identify a set 12 of pixels shown in the lower left of FIG. 6. The pixels corresponding to the original image should be contiguous in the pixel domain, so non-contiguous outliers (e.g., pixel 13) may be disregarded. This effectively segments from the test image the portion 14 shown in the lower right of FIG. 6. This portion can then be checked (e.g., by the histogram techniques detailed in this specification, or by other techniques—such as SIFT) for matching to the original image.

Perspective

Histograms vary slowly with change in perspective introduced by viewpoint changes. As a result, matching based on histograms is robust under most perspective transformations.

Results Under Geometric Transformations and Other Distortions

Figure 7:
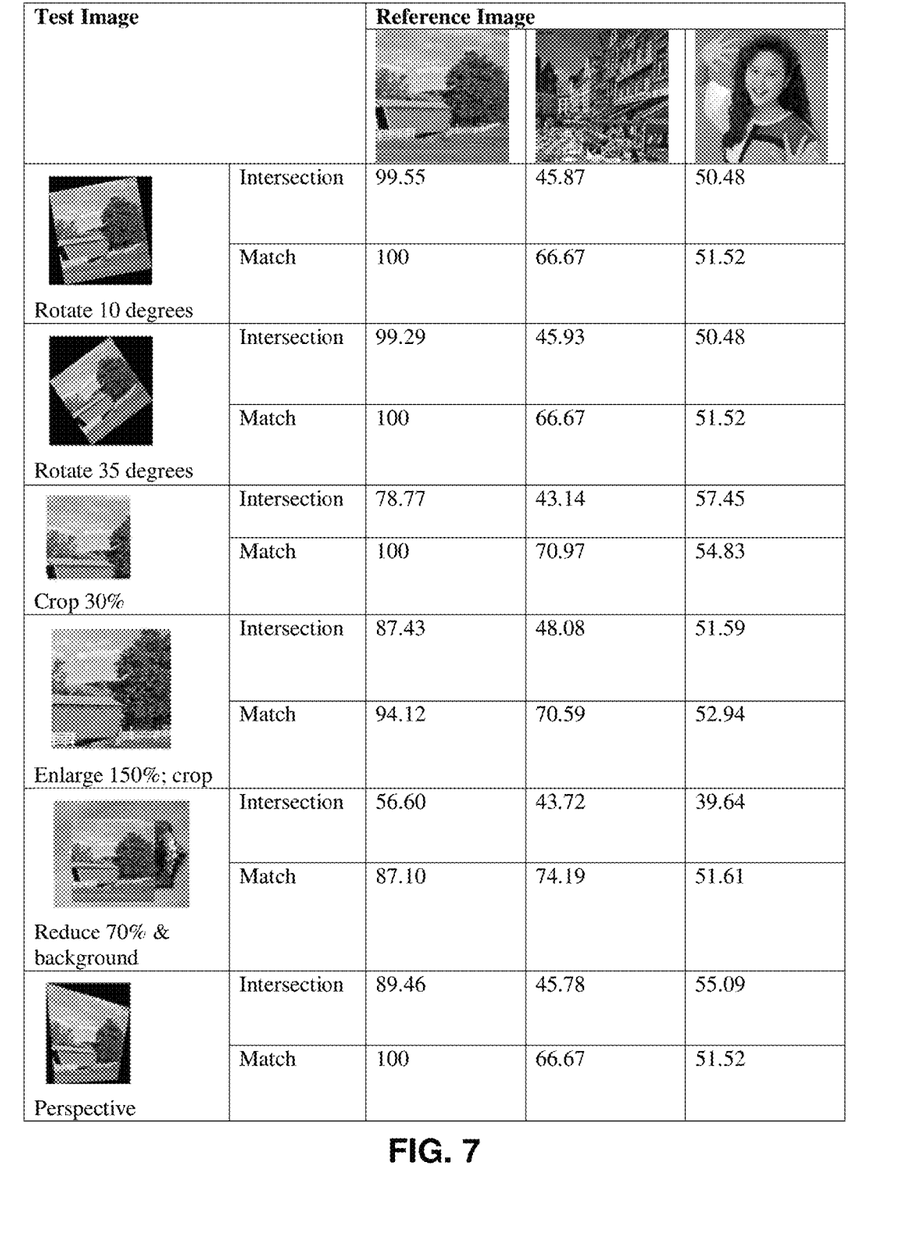
FIG. 7 is a table showing matches between reference images and test images, for selected geometrical transformations and other distortions.

FIG. 7 shows results of matching for transformed/distorted images using some of the techniques described above. The test images consist of various transformations and/or distortions to one of the reference images. The histogram created for each image consists of a thresholded tri-level second derivative of luminance (difference of Gaussian) along one axis, and the RG and BY components along the other two axes (nonuniformly quantized to 16 bins).

The "Intersection" measure shows the standardized histogram intersection between the test and reference images. The "Match" measure shows the maximum of the percentage of occupied bins of the test image that are a subset of the occupied bins of the reference image and the percentage of occupied bins of the reference image that are a subset of the occupied bins of the test image. The specific transformation is listed under each test image.

The results show that the intersection and match metrics are high for the correct match. One or more thresholds can be applied to either, and/or both, to classify the test image. For example, if the Intersection score is greater than 60 AND the Match score is greater than 90, then some or all of the test image likely matches the reference image. If the Intersection score is less than 45 OR the Match score is less than 80, then there is likely no match. Other cases can be assigned an indeterminate status.

Combinations of these metrics can also be computed, such as their product or a polynomial combination, and tested against a threshold. For example, if the Identification.x.Match product is greater than 4000, then some or all of the test image likely matches the reference image. If the product is less than 3500, then there is likely no match. Again, other cases can be assigned an indeterminate status.

Other metrics, and other histograms, can naturally be used.

Depending on the particular application, the results of such tests may not provide a definitive answer to identification of a match. However, the process is always useful as a screening function—to limit a universe of reference images to which a test image may be matched. Other techniques can then be employed to further refine the answer. (Or, such further techniques can be applied earlier, and the present technology can then be used to yield a final answer.)

Further Extensions

The concepts described so far can be extended further to suit application needs or to increase robustness. A few such extensions are described below.

Dividing the Test and Reference Images Into Subimages

So far, one histogram has been computed from the test image and one from the reference image. Instead, the images can be partitioned into smaller sub-images or subregions, say by dividing them up into subblocks or other suitable partitions, or using image segmentation techniques (e.g., by methods including clustering, edge detection, region growing, watershed transformation, etc.). These sub-images can then be used for matching and recognition.

Many of these approaches induce some information about shape and structure into the matching process, and can increase the confidence in a match. For example, consider the case where the intersection of two images is high and several subblocks between these images also have a high intersection. Then there is a higher probability that the match is correct. The arrangements discussed above involving combinations of metrics, and thresholds, can be employed here too.

Coarse to Fine Strategy

A coarse to fine strategy can be employed while searching for a match. In this strategy, multiple histograms are stored in the database for each reference image. The multiple histograms are created first using coarse quantization of the histogram dimensions and then by successively using finer quantization. The search for a match proceeds by first using the coarsely quantized histogram to reduce the search space, and then using increasingly finer quantization to hone in on a match.

Combining Histogram Information with Other Recognition Features

Histogram-based matching can be combined with other recognition features to provide better discrimination. For example salient points, local descriptors, SIFT, shape, structure and texture can be explicitly used to disambiguate between histograms that are close. Such features can also be used within the histogram representation itself. Alternatively, histograms can be used to drastically reduce the search space and then other techniques can be used to provide the final recognition or identification.

Application to Video

Video can be characterized by the temporal change of coarsely quantized histograms. For example, consider 2 bins for each of luminance and the two opponent color axes. Then each frame of video can be characterized by 8 bins.

In one implementation, the bin counts can be stored, and can serve as a fingerprint by which the video can be recognized. Alternatively, instead of storing the bin counts, the difference from the count of the previous frame can be stored. Or just the sign of the difference can be stored. Alternatively each bin can be compared with the corresponding bins in one or several preceding and succeeding frames to derive a bit sequence representative of the video frame in a temporal context. These bit sequences or signatures can then be used for video matching or identification.

Search-Space Reduction

In a large scale recognition system, the present technology can be used to supplement other recognition features such as local descriptors of salient points, SIFT, shape, texture, etc. A modification of the histogram matching technique can be used for fast lookups (or binary searches) that can reduce the search space for matching for some of the other recognition features. When used for the purpose of search space reduction, the histograms can be coarsely constructed with fewer bins on each of the axes.

Lookup Using Histogram Bin Indices

In this approach, indices of the non-zero bins of the test image are used to isolate the images in a reference database for which the corresponding bins are non-zero. As an example, consider a 1D histogram with 8 bins. Assume that the first three bins are non-zero for the test image. Then the reference database for matching can be reduced by looking up images in the reference database having non-zero first three bins. This concept can be extended to 3D histograms (or even histograms of arbitrary dimensionality) without loss of generality.

Binary Lookup

Another approach to fast search-space reduction is to binarize bin locations based on bin occupancy. In the above example of the 1D histogram with 8 bins, each bin can be represented with a binary value: 1 if the bin is occupied (bin count is non-zero, or above some occupancy threshold) and 0 otherwise. Then the 8-bit vector can be used to quickly create lookups for all images in the reference database with values of 1 in the first three locations in the lookup example above. This concept can be extended to multi-dimension histograms. For example, if the histogram contains 4 bins for second derivative luminance information, and 8 bins each for the color directions, then a 20-bit vector can represent the non-zero bin locations. To improve robustness, bin locations neighboring occupied bins can be labeled with value 1—assuring that boundary case quantizations that may fall into adjoining bins (e.g., due to noise or other circumstances) aren't missed.

Background Confusion

Search space reduction techniques tend to break down when background confusion is present. Background colors and features are not present in the reference images. Discarding reference images that do not contain bins corresponding to the background, will cause matching to fail. One solution to deal with this issue is to divide the image into smaller subregions, as discussed above, to ensure that there will be at least one subregion that does not contain the background.

SIFT

As noted, the present technology can be used in conjunction with other image recognition technologies. One popular such technology is SIFT.

SIFT is an acronym for Scale-Invariant Feature Transform, a computer vision technology pioneered by David Lowe and described in various of his papers including "Distinctive Image Features from Scale-Invariant Keypoints," International Journal of Computer Vision, 60, 2 (2004), pp. 91-110; and "Object Recognition from Local Scale-Invariant Features," International Conference on Computer Vision, Corfu, Greece (September 1999), pp. 1150-1157, as well as in U.S. Pat. No. 6,711,293.

SIFT works by identification and description—and subsequent detection—of local image features. The SIFT features are local and based on the appearance of the object at particular interest points, and are invariant to image scale, rotation and affine transformation. They are also robust to changes in illumination, noise, and some changes in viewpoint. In addition to these properties, they are distinctive, relatively easy to extract, allow for correct object identification with low probability of mismatch and are straightforward to match against a (large) database of local features. Object description by set of SIFT features is also robust to partial occlusion; as few as 3 SIFT features from an object can be enough to compute location and pose.

The technique starts by identifying local image features— termed keypoints—in a reference image. This is done by convolving the image with Gaussian blur filters at different scales (resolutions), and determining differences between successive Gaussian-blurred images. Keypoints are those image features having maxima or minima of the difference of Gaussians occurring at multiple scales. (Each pixel in a difference-of-Gaussian frame is compared to its eight neighbors at the same scale, and corresponding pixels in each of the neighboring scales (e.g., nine other scales). If the pixel value is a maximum or minimum from all these pixels, it is selected as a candidate keypoint.

(It will be recognized that the just-described procedure is a blob-detection method that detects space-scale extrema of a scale-localized Laplacian transform of the image. The difference of Gaussians approach is an approximation of such Laplacian operation, expressed in a pyramid setting.)

The above procedure typically identifies many keypoints that are unsuitable, e.g., due to having low contrast (thus being susceptible to noise), or due to having poorly determined locations along an edge (the Difference of Gaussians function has a strong response along edges, yielding many candidate keypoints, but many of these are not robust to noise). These unreliable keypoints are screened out by performing a detailed fit on the candidate keypoints to nearby data for accurate location, scale, and ratio of principal curvatures. This rejects keypoints that have low contrast, or are poorly located along an edge.

More particularly this process starts by—for each candidate keypoint—interpolating nearby data to more accurately determine keypoint location. This is often done by a Taylor expansion with the keypoint as the origin, to determine a refined estimate of maxima/minima location.

The value of the second-order Taylor expansion can also be used to identify low contrast keypoints. If the contrast is less than a threshold (e.g., 0.03), the keypoint is discarded.

To eliminate keypoints having strong edge responses but that are poorly localized, a variant of a corner detection procedure is applied. Briefly, this involves computing the principal curvature across the edge, and comparing to the principal curvature along the edge. This is done by solving for eigenvalues of a second order Hessian matrix.

Once unsuitable keypoints are discarded, those that remain are assessed for orientation, by a local image gradient function. Magnitude and direction of the gradient are calculated for every pixel in a neighboring region around a keypoint in the Gaussian blurred image (at that keypoint's scale). An orientation histogram with 36 bins is then compiled—with each bin encompassing ten degrees of orientation. Each pixel in the neighborhood contributes to the histogram, with the contribution weighted by its gradient's magnitude and by a Gaussian with $\sigma 1.5$ times the scale of the keypoint. The peaks in this histogram define the keypoint's dominant orientation. This orientation data allows SIFT to achieve rotation robustness, since the keypoint descriptor can be represented relative to this orientation.

From the foregoing, plural keypoints are different scales are identified—each with corresponding orientations. This data is invariant to image translation, scale and rotation. 128 element descriptors are then generated for each keypoint, allowing robustness to illumination and 3D viewpoint.

This operation is similar to the orientation assessment procedure just-reviewed. The keypoint descriptor is computed as a set of orientation histograms on (4×4) pixel neighborhoods. The orientation histograms are relative to the keypoint orientation and the orientation data comes from the Gaussian image closest in scale to the keypoint's scale. As before, the contribution of each pixel is weighted by the gradient magnitude, and by a Gaussian with $\sigma 1.5$ times the scale of the keypoint. Histograms contain 8 bins each, and each descriptor contains a 4×4 array of 16 histograms around the keypoint. This leads to a SIFT feature vector with (4×4×8=128 elements). This vector is normalized to enhance invariance to changes in illumination.

The foregoing procedure is applied to training images to compile a reference database. An unknown image is then processed as above to generate keypoint data, and the closest-matching image in the database is identified by a Euclidian distance-like measure. (A "best-bin-first" algorithm is typically used instead of a pure Euclidean distance calculation, to achieve several orders of magnitude speed improvement.) To avoid false positives, a "no match" output is produced if the distance score for the best match is close—e.g., 25%—to the distance score for the next-best match.

To further improve performance, an image may be matched by clustering. This identifies features that belong to the same reference image—allowing unclustered results to be discarded as spurious. A Hough transform can be used—identifying clusters of features that vote for the same object pose.

An article detailing a particular hardware embodiment for performing the SIFT procedure, suitable for implementation in a next generation cell phone, is Bonato et al, "Parallel Hardware Architecture for Scale and Rotation Invariant Feature Detection," IEEE Trans on Circuits and Systems for Video Tech, Vol. 18, No. 12, 2008.

An alternative hardware architecture for executing SIFT techniques is detailed in Se et al, "Vision Based Modeling and Localization for Planetary Exploration Rovers," Proc. of Int. Astronautical Congress (IAC), October, 2004.

While SIFT is perhaps the most well known technique for generating robust local descriptors, there are others, which may be more or less suitable—depending on the application. These include GLOH (c.f., Mikolajczyk et al, "Performance Evaluation of Local Descriptors," IEEE Trans. Pattern Anal. Mach. Intell., Vol. 27, No. 10, pp. 1615-1630, 2005) and SURF (c.f., Bay et al, SURF: Speeded Up Robust Features," Eur. Conf. on Computer Vision (1), pp. 404-417, 2006; Chen et al, "Efficient Extraction of Robust Image Features on Mobile Devices," Proc. of the 6$^{th}$ IEEE and ACM Int. Symp. On Mixed and Augmented Reality, 2007; and Takacs et al, "Outdoors Augmented Reality on Mobile Phone Using Loxel-Based Visual Feature Organization," ACM Int. Conf. on Multimedia Information Retrieval, October 2008).

As noted, the present histogram technology can be employed in conjunction with SIFT or these other techniques.

CONCLUDING REMARKS

From the foregoing it will be seen that a variety of techniques based on multidimensional histograms can be employed to characterize, match and recognize objects and images. These techniques can be robust under geometric transformations as well as luminance, and illumination changes. Because they involve simple computations, these arrangements can be implemented efficiently on cell phones and other handheld devices, or embedded systems.

Having described and illustrated the principles of our technology with reference to illustrative embodiments and arrangements, it will be recognized that the detailed implementations are exemplary only and should not be taken as limiting the scope of our technology.

For example, while the detailed techniques were described in the context of image data represented in the spatial (pixel) domain, the same techniques can be applied to image information represented in other domains. For example, FFT data can be produced for each of the different color axes, and/or the luminance axis, and the techniques detailed can be applied to the resulting spatial frequency domain data. (The documents incorporated by reference detail a variety of other domains.)

Similarly, the present technology can be applied to image data that has been otherwise processed, including filtered by different filter techniques. (Sample filtering operations include median, Laplacian, Wiener, Sobel, high-pass, low-pass, bandpass, Gabor, signum, etc. Digimarc's U.S. Pat. Nos. 6,442,284, 6,483,927, 6,516,079, 6,614,914, 6,631,1, 98, 6,724,914, 6,988,202, 7,013,021 and 7,076,082 show various such filters.) The test or reference imagery may also have been subjected to various geometric transformations. Exemplary is the de-warping arrangement employed by Google in producing flat-scans of book pages from non-flat originals, as detailed in its U.S. Pat. No. 7,508,978.

While the specification has employed section headings for ease of reference, these should not be taken as limiting the applicability or generality of the disclosed technologies.

Reference was often made to a luminance axis. It should be understood that luminance, per se, need not be used. The axis can correspond to a value derived from luminance information, such as difference of Gaussian, etc. Of course in other implementations, a luminance axis may not be used at all, or another image parameter can be substituted.

While the focus of this specification has been on imagery (and thus also video), many of the same histogram techniques and comparison metrics are likewise relevant in audio processing and recognition. Thus, the specification should be read as teaching audio analogs to the image arrangements that have been detailed.

It will be understood that features detailed in the present specification individually can be used in combination with others of the detailed features and arrangements. Similarly, features described in the present specification can be employed in combination with the technologies detailed in the patent documents incorporated by reference (and vice versa).

The present technology can be employed in various image-responsive systems. Examples are detailed in Digimarc's U.S. Pat. No. 6,947,571, and patent documents 20060240862 and 20060012677 (both to Google), 20070175998 and 20020102966 (both to Lev), 20060056707 (Nokia) 20060026140 (ExBiblio), 20030083098 (Canon), 20010001854 (AirClic), U.S. Pat. No. 7,016,532 (Evryx), and U.S. Pat. No. 6,491,217 (Philips), as well as the other patent documents referenced in this specification.

The detailed technology may be regarded as a form of robust image fingerprinting. Additional information on content fingerprinting and related systems is found, e.g., in patent documents 20050004941, 20050108242, 20060041753, 20060075237, 20060218126, 20070071330 (all to Philips), 20070239756 (Microsoft), 20070237364 (Fuji Photo Film), U.S. Pat. No. 7,130,466 (Cobion), U.S. Pat. No. 7,194,752 (Kenyon), 20070253594 (Vobile), 20020044659 (NEC), and 20070250716 (Digimarc).

A complementary technology, digital watermark decoding, can be used in certain embodiments. Technology for encoding/decoding watermarks is detailed, e.g., in Digimarc's U.S. Pat. Nos. 6,590,996 and 6,122,403, and in pending application Ser. No. 12/125,840 by Sharma et al, filed May 22, 2008. The use of digital watermarks and fingerprints in conjunction is detailed, e.g., in Digimarc's U.S. Pat. No. 7,289,643.

Geometric calibration data is commonly carried by digital watermarks. These allow affine and other transformations of imagery to be readily identified and, if desired, compensated for. Such arrangements are detailed, e.g., in U.S. Pat. Nos. 6,614,914, 6,580,809, 7,072,490 and 7,319,775, and in patent publication 20060031684. U.S. Pat. No. 6,959,098 teaches how distortion can be characterized by such watermark calibration signals in conjunction with visible image features (e.g., edges of a rectilinear object). From such affine distortion information, the 6D location of a watermarked object relative to the imager of a cell phone can be determined.

In certain embodiments, a response to visual stimulus can include a graphical overlay presented on a cell phone screen—atop image data captured by the cell phone camera. The overlay can be geometrically registered with features in the image data, and be affine-distorted in correspondence with affine distortion of an object depicted in the image. Such technology is further detailed, e.g., in Digimarc's patent publication 20080300011.

Reference was most commonly made to matching images (e.g., test images to reference/original images). However, the artisan will understand that the same arrangements can be employed to match objects captured in a test image. Thus, references to matching images (or image data) should be understood also to refer to matching objects (or object data).

Just as SIFT techniques operate on images at different scale factors, so too can the present technology. Due to the simplicity of the calculations involved, histogram-based data at a variety of scale factors can quickly be computed.

While reference has been made to cell phones, it will be recognized that this technology finds utility with all manner of devices—both portable and fixed. PDAs, organizers, portable music players, desktop computers, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones.

(Details of the iPhone, including its touch interface, are provided in published patent application 20080174570.)

Figure 8:
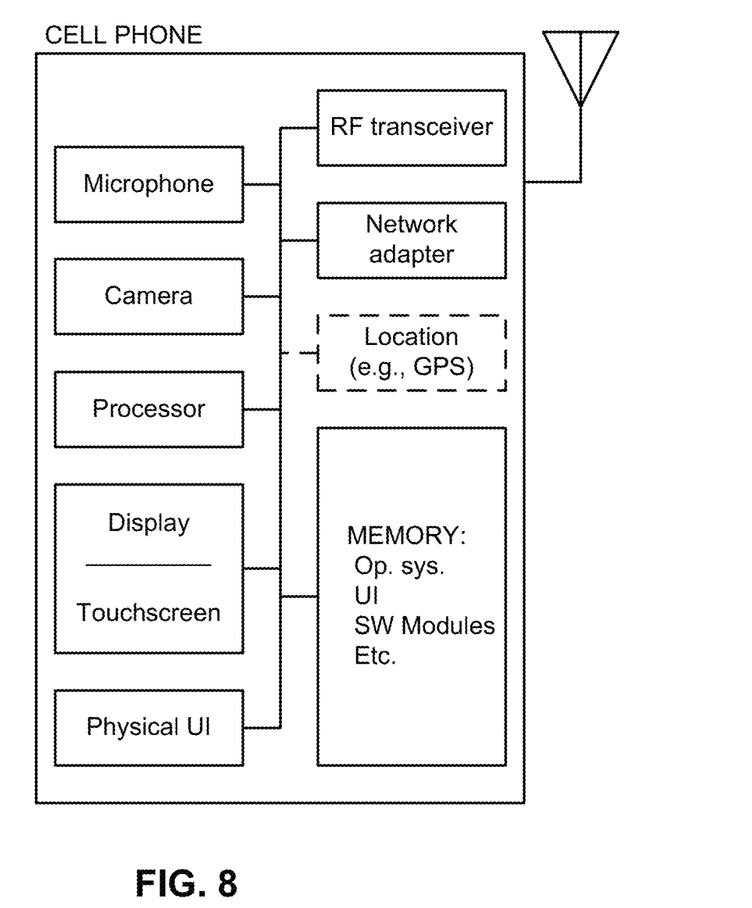
FIG. 8 is a block diagram of a cell phone, suitable for use with the present technology.

The design of cell phones and other computers that can be employed to practice the methods of the present disclosure are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), a battery, and an interface for communicating with other devices (which may be wireless, such as GSM, CDMA, W-CDMA, CDMA2000, TDMA, EV-DO, HSDPA, WiFi, WiMax, or Bluetooth, and/or wired, such as through an Ethernet local area network, a T-1 internet connection, etc). An exemplary cell phone that can be used to practice part or all of the detailed arrangements is shown in FIG. 8.

The processor can be a special purpose hardware device, or may be implemented by a programmable device executing software instructions read from a memory or storage, or by combinations thereof. (The ARM series of CPUs, using a 32-bit RISC architecture developed by Arm, Limited, is used in many cell phones.) References to "processor" should thus be understood to refer to functionality, rather than any particular form of implementation.

In addition to implementation by dedicated hardware, or software-controlled programmable hardware, the processor can also comprise a field programmable gate array, such as the Xilinx Virtex series device. Alternatively the processor may include one or more digital signal processing cores, such as Texas Instruments TMS320 series devices.

Software instructions for implementing the detailed functionality can be readily authored by artisans, from the descriptions provided herein. ences, conclusions, and other determinations noted above.

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. For example, extraction of histogram data from a test image on a cell phone, and searching of a database for corresponding reference images on a remote server, is one architecture, but there are many others. For example, information about reference images may be stored on the cell phone—allowing the cell phone to capture a test image, generate histogram data, and compare against stored histogram data for reference images—all without reliance on externals devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.)

In like fashion, data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through Bluetooth communication, and involves one or more of the nearby devices in an operation.)

To provide a comprehensive disclosure without unduly lengthening this specification, applicant expressly incorporates by reference the patents, patent applications and other document noted above. (Such documents are incorporated in their entireties, even if cited above in connection with specific of their teachings.) These references disclose technologies and teachings that can be incorporated into the arrangements detailed herein, and into which the technologies and teachings detailed herein can be incorporated.

I claim as my technology all such modifications as may fall within the scope and spirit of the following claims, and equivalents thereto.

I claim:

1. A method comprising the acts:
    determining, for each of plural pixels in a received input image, three data, the first datum indicating a value of a first color parameter at said pixel, the second datum indicating a value of a second color parameter at said pixel, and the third datum indicating a value of a luminance parameter at said pixel;

generating a histogram for the received input image, said histogram comprising (a) first data indicating a count of pixels in the received input image having said determined first datum within each of M quantized first color parameter value ranges, (b) second data indicating a count of pixels in the received input image having said determined second datum within each of M quantized second color parameter value ranges, and (c) third data indicating a count of pixels in the received input image having said determined third datum within each of N quantized luminance parameter ranges; and comparing the generated histogram against a collection of reference histograms to identify a reference histogram that corresponds to the generated histogram, to thereby identify the input image;

wherein at least said act of generating the histogram is performed by a cell phone that includes a programmable device that executes software instructions read from a memory, a camera, a touchscreen and a display; and N is less than half of M.

2. The method of claim 1 wherein N is one-fourth of M.

3. The method of claim 1 in which M is 16 and N is 4.

4. The method of claim 1 wherein N is three-sixteenths of M.

5. The method of claim 1 in which the M is 16 and N is 3.

6. The method of claim 1 wherein N is one-eighth of M.

7. The method of claim 1 in which M is 16 and N is 2.

8. The method of claim 1 in which the luminance parameter for each of said pixels comprises a value of a derivative of the input image luminance at said pixel.

9. The method of claim 8 in which N is three: one of said three quantized luminance parameter ranges counting pixels for which the derivative value has an absolute value less than a threshold value, another of said three quantized luminance parameter ranges counting pixels for which the derivative value is above said threshold value, and a third of said quantized luminance parameter ranges counting pixels for which a negative of said derivative value is above said threshold value.

10. The method of claim 8 in which N is two: one of said two quantized luminance parameter ranges counting pixels for which the derivative value is above a threshold value, and a second of said two quantized luminance parameter ranges counting pixels for which a negative of said derivative value is above said threshold value.

11. The method of claim 1 in which the luminance parameter for each of said pixels comprises a value of a second derivative function of the input image luminance at said pixel.

12. The method of claim 11 in which the said second derivative function comprises a Laplacian of Gaussian operator.

13. The method of claim 11 in which the said second derivative function comprises a Laplacian operator.

14. The method of claim 11 in which the said second derivative function comprises a difference of Gaussians operator.

15. The method of claim 1 wherein the generated histogram is a 3D histogram.

16. The method of claim 1 wherein said M quantized first color parameter value ranges are non-uniformly quantized.

17. The method of claim 1 in which said first determined datum indicates a value of the first color parameter along a red-green color axis, and said second determined datum indicates a value of the second color parameter along a blue-yellow color axis, and the method further includes normalizing opponent color directions by a difference between the maximum of {three red/green/blue color values} at a pixel, and a minimum of said {three red/green/blue color values} at said pixel.

18. The method of claim 17 in which said first determined datum comprises a value RG' along the red-green color axis, and said second determined datum comprises a value BY' along the blue-yellow color axis, and the method further includes normalizing opponent color directions by a difference between the maximum of {three red/green/blue color values} at a pixel, and a minimum of said {three red/green/blue color values} at said pixel, wherein:

Max Val=Max(R,G,B);

Min Val=Min(R,G,B);

RG'=(R−G)/(Max Val−Min Val); and

BY'=(B−0.5*(R+G))/(Max Val−Min Val).

19. The method of claim 1 wherein the first datum indicates a value of color contrast parameter at said pixel.

20. An image processing system comprising a memory, a programmable device that executes software instructions read from said memory, a camera, a touchscreen, and a display, said software instructions causing the system to perform acts including:

determining, for each of plural pixels in a received input image, three data, the first datum indicating a value of a first color parameter at said pixel, the second datum indicating a value of a second color parameter at said pixel, and the third datum indicating a value of a luminance parameter at said pixel;

generating a histogram for the received input image, said histogram comprising (a) first data indicating a count of pixels in the received input image having said determined first datum within each of M quantized first color parameter value ranges, (b) second data indicating a count of pixels in the received input image having said determined second datum within each of M quantized second color parameter value ranges, and (c) third data indicating a count of pixels in the received input image having said determined third datum within each of N quantized luminance parameter ranges; and comparing the generated histogram against a collection of reference histograms to identify a reference histogram that corresponds to the generated histogram, to thereby identify the input image;

wherein N is less than half of M.

* * * * *